United States Patent [19]

Porter et al.

[11] Patent Number: 5,387,566
[45] Date of Patent: Feb. 7, 1995

[54] BINDING AND SHAPING OF CRACKING CATALYST FINES

[75] Inventors: Randall A. Porter; Jesse R. Harris; Donald H. Kubicek, all of Bartlesville, Okla.

[73] Assignee: Phillips Petroleum Company, Bartlesville, Okla.

[21] Appl. No.: 217,473

[22] Filed: Mar. 24, 1994

[51] Int. Cl.$^6$ .......................... B01J 29/06; B01J 37/00
[52] U.S. Cl. ...................... 502/64; 502/60; 502/69
[58] Field of Search ................ 502/8, 60, 64, 69

[56] References Cited

U.S. PATENT DOCUMENTS

| | | | |
|---|---|---|---|
| 3,377,295 | 4/1968 | Pryor | 502/64 |
| 3,562,162 | 2/1971 | Pitha | 252/63.2 |
| 3,674,518 | 7/1972 | Vuaroqueau | 106/38.27 |
| 4,522,926 | 6/1985 | Felice | 501/127 |
| 4,714,690 | 12/1987 | Strack et al. | 502/64 |
| 4,808,299 | 2/1989 | Latimer et al. | 208/251 R |
| 4,977,122 | 12/1990 | Eberly | 502/69 |
| 4,987,110 | 1/1991 | Scherzer | 502/68 |
| 5,151,391 | 9/1992 | Fu et al. | 502/27 |
| 5,173,463 | 12/1992 | Macedo | 502/81 |
| 5,188,995 | 2/1993 | Maholland et al. | 502/28 |

OTHER PUBLICATIONS

Kirk–Othmer Encyclopedia of Chemical Technology, Third Edition, vol. 5, 1979, pp. 187–191.
Kirk–Othmer Encyclopedia of Chemical Technology, Third Edition, vol. 20, 1982, pp. 771–775.

Primary Examiner—Carl F. Dees
Attorney, Agent, or Firm—K. K. Brandes

[57] ABSTRACT

A process for converting catalytic cracking catalyst fines to a shaped composition comprises acid-treatment of catalytic cracking catalyst fines, followed by separation and drying of the acid-treated fines; preparing a shapable mixture by mixing the dried catalyst fines with calcium aluminate, sodium silicate, phosphoric acid and water; shaping (preferably extruding) the obtained shapable mixture; and drying and thereafter calcining the obtained shaped particles. A shaped composition having high crash strength is obtained by this process.

20 Claims, No Drawings

BINDING AND SHAPING OF CRACKING CATALYST FINES

BACKGROUND OF THE INVENTION

This invention relates to a process for converting fluidized cracking catalyst fines to useful shaped compositions.

Commercial fluidized catalytic cracking (FCC) processes generate catalyst fines due to abrasion in FCC riser reactors and in regenerators. Catalyst fines which are not recycled have to be disposed of and may cause environmental problems because they generally contain metal contaminants. Thus, it would be desirable to convert these catalyst fines to useful products. The present invention is directed to a process for treating FCC catalyst fines and then shaping (e.g., extruding) them so as to make composites which are useful as sorbent materials.

SUMMARY OF THE INVENTION

It is an object of this invention to prepare shaped compositions from FCC cracking catalyst fines. Other objects and advantages become apparent from the detailed description of the invention and the appended claims.

In accordance with this invention, a process for making a shaped composition from catalytic cracking catalyst fines comprises the steps of:

(a) contacting zeolite-containing catalytic cracking catalyst particles having an average particle size of about 10 microns (micrometers) to about 100 microns with an aqueous acid solution comprising at least one acid selected from the group consisting of sulfuric acid, nitric acid, hydrochloric acid, and carboxylic acids containing 1–8 carbon atoms per molecule for a time period of at least about 10 minutes, (b) substantially separating said aqueous acid solution from the acid-treated catalyst particles obtained in step (a), (c) substantially drying the separated, acid-treated catalyst particles obtained in step (b), (d) mixing the substantially dried, acid-treated catalyst particles obtained in step (c) with calcium aluminate, at least one sodium silicate, phosphoric acid and water so as to prepare a shapable mixture, (e) shaping (preferably extruding) the mixture obtained in step (d), (f) substantially drying the shaped particles obtained in step (e), and (g) calcining the substantially dried, shaped particles obtained in step (f) at a temperature of about 500° C. to about 900° C. for a time period of at least about 0.5 hour.

Preferably, the aqueous acid solution employed in step (a) contains citric acid or sulfuric acid.

Also in accordance with this invention, shaped particles prepared by the above-defined process comprising steps (a) through (g) are provided.

DETAILED DESCRIPTION OF THE INVENTION

Any small zeolite-containing catalytic cracking catalyst particles (fines) can be employed as the starting material in step (a) of the process of this invention. These catalytic cracking catalyst particles can be fresh, but they are generally "spent" (i.e., used and thereafter regenerated) catalyst particles, or they can be "equilibrium catalyst particles" (i.e., a mixture of regenerated, used catalyst particles and fresh catalyst particles). The term "catalytic cracking catalyst particles," as used herein, encompasses cracking catalysts which are commonly employed in commercial catalytic cracking operations, preferably fluidized catalytic cracking (FCC) processes. Generally, these particles are a physical blend of used, regenerated equilibrium catalysts particles comprising a mixture of catalyst particles of various ages (i.e., a portion of the equilibrium catalyst particles has passed through a varying number of cracking and regeneration cycles, while a small portion of the equilibrium catalyst particles may be fresh). The zeolite-containing catalytic cracking catalyst particles employed in the process of this invention generally contain metal compounds as contaminants (particularly oxides of Ni, V, Fe, Cu, Sb, and the like). Each of these contaminants can be present in amounts ranging from traces (about 0.01 weight-%) to about 1 weight-%. These metal impurities in the cracking catalyst particles have generally been absorbed from the oil feed in previous cracking operations.

The zeolite component of the zeolite-containing catalytic cracking catalyst particles employed in step (a) of the process of this invention can be any natural or synthetic crystalline aluminosilicate zeolite which exhibits cracking activity. Non-limiting examples of such zeolites are faujasite, chabazite, mordenite, offretite, erionite, Zeolon, zeolite X, zeolite Y, zeolite L, zeolite ZSM-4, zeolite ZSM-5, zeolite ZSM-11, zeolite ZSM-12, zeolite ZSM-23, Zeolite ZSM-35, zeolite ZSM-38, zeolite ZSM-48, and the like, and mixtures thereof. Additional examples of suitable zeolites are listed in U.S. Pat. No. 4,158,621. The term "zeolite", as used herein, includes zeolites which have been pretreated, such as those from which a portion of Al has been removed from the crystalline framework, and zeolites which have been ion-exchanged with rare earth metal or ammonium or by other conventional ion-exchange methods. The term "zeolite", as used herein, also includes essentially aluminum-free silica polymorphs, such as silicalite, chromiasilicates, ferrosilicates, borosilicates, and the like, as disclosed in U.S. Pat. No. 4,556,749.

Generally, the zeolite component of the catalytic cracking catalyst particles is dispersed in a suitable solid refractory inorganic matrix material, such as alumina, silica, silica-alumina (presently preferred), aluminum phosphate, magnesium oxide, mixtures of two or more of the above-listed materials, and the like. Generally, the weight ratio of zeolite to matrix material in the catalytic cracking catalyst particles is in the range of from about 1:20 to about 1:1. The preparation of such zeolite/matrix catalytic cracking catalyst particles is well known and is not a critical feature of this invention. Generally, the surface area (measured by nitrogen adsorption, substantially in accordance with the BET method of Brunauer, Emmett and Teller) of the catalytic cracking catalyst particles employed in step (a) is in the range of from about 40 m$^2$/g to about 200 m$^2$/g. The size of the catalytic cracking catalyst particles employed in the process of this invention generally is in the range of about 10 microns to about 100 microns, preferably about 30–60 microns.

Any suitable carboxylic acid which is at least partially soluble in water can be employed in step (a) of the process of this invention. Non-limiting examples of such acids are: formic acid, acetic acid, mono-, di- and trichloracetic acids, mono-, di- and trifluoroacetic acids, propionic acid, malonic acid, glutaric acid, succinic acid, adipic acid, pimelic acid, cyclohexanecarboxylic acid, benzoic acid, o-, m- and p-phthalic acids, hydroxyacetic acid, hydroxypropionic acid, lactic acid, citric acid, taaaric acid, salicylic acid, and mixtures thereof. Mineral acids which are equally effective in step (a) of the process of this invention are $H_2SO_4$, $HNO_3$ and HCl. Presently preferred acids are citric acid and sulfuric acid.

The contacting of the catalytic cracking catalyst particles with the aqueous acid solution in step (a) can be carried out by any suitable means. Generally, the catalytic catalyst particles are soaked in the acid solution, or the acid solution is passed through a bed of catalytic cracking catalyst particles. The acid concentration in the acid solution generally is in the range of about 0.1 to about 1.0 mol/l, preferably about 0.2–0.5 mol/l. The weight-ratio of the aqueous acid solution to the catalytic cracking catalyst particles generally is in the range of about 1:1 to about 5:1, preferably about 1:1 to about 2.5:1. The time of contact between the catalytic cracking catalyst particles and the aqueous acid solution generally is in the range of about 5 minutes to about 12 hours, preferably about 5 minutes to about 6 hours. It is preferred (but not necessary) to agitate (e.g., by stirring) the mixture of catalytic cracking catalyst particles and acid solution in step (a).

The substantial separation of the acid-treated catalytic cracking catalyst particles from the aqueous acid solution in step (b) can be carried out by any of the well known solid-liquid separation means, such as decanting, filtering (presently preferred) and centrifuging. It is within the scope of this invention (but not necessary) to wash the substantially separated acid-treated catalyst particles, e.g., with water or an alcohol (methanal, ethanol), or a ketone (acetone).

Drying step (c) can be carried out in any suitable manner, generally at a temperature of about 80°–200° C. for about 10 minutes to about 20 hours, so as to obtain particles having a moisture content of no higher than about 5 weight-%, preferably about 1–5 weight-% $H_2O$.

Mixing step (d) can be carried out in any mixing device, preferably in a mechanical mixer having internal mixing means (such as screws or paddles). This step is carried out for a time period sufficient to provide a substantially homogeneous, shapable mixture, generally for about 1 minute to about 2 hours. It is presently preferred to first combine sodium silicate, phosphoric acid and water to form a liquid binder mixture, which generally contains about 30–35 weight-% sodium silicate, about 10–15 weight-% phosphoric acid and about 50–60 weight-% water, and then combine this liquid binder with the acid-treated cracking catalyst particles and calcium aluminate ($CaAl_2O_4$, a solid binder). The at least one sodium silicate can be any of the substantially water-soluble sodium silicates (disclosed in U.S. Pat. No. 4,808,299, herein incorporated by reference), preferably those contained in water glass (a commercial cement). The phosphoric acid can be orthophosphoric acid, or pyrophosphoric acid, or polyphosphoric acid, or metaphosphoric acid, preferably orthophosphoric acid ($H_3PO_4$). The shapable mixture obtained in step (d) generally is formed by employing about 60–70 weight-% acid-treated cracking catalyst particles, about 1–2 weight-% calcium aluminate, about 5–10 weight-% sodium silicate, about 1–5 weight-% phosphoric acid, and about 10–20 weight-% water.

Shaping step (e) can be carried out in any conventional shaping equipment, such as an extruder equipped with a suitable die plate through which the shapable mixture is extruded, or a tabletting machine wherein the shapable mixture is compacted under pressure, or a pelletizer wherein the shapable mixture is agglomerized to ball-shaped particles. The shaped particles obtained in step (e) can have a cylindrical or a spherical or a trilobal or any other suitable shape. Presently preferred are extruded cylindrical particles which can have any suitable size (preferably a diameter of about 1/16–¼ inch and a height of about 1/16–¼ inch). It is within the scope of this invention to have suitable processing aids (such as zinc stearate, graphite, cellulose microgel and the like) present in shaping step (e), and to marumerize the shaped particles (i.e., smooth sharp edges of extruded particles by tumbling them in a rotary mixer).

Drying step (f) can be carried out in any suitable manner. Generally, the shaped particles are substantially dried (preferably in air) at a temperature of about 80°–200° C. for a time period of about 0.5–5 hours. The water content of the substantially dried particles generally is less than about 5 weight-%.

Calcining step (g) can be carried out in any suitable manner. Generally, the substantially dried particles obtained in step (f) are calcined (preferably in air) at a temperature of about 500°–900° C. for a time period of about 5 minutes to about 20 hours, preferably at a temperature of about 600°–800° C. for about 1–3 hours. The calcined particles generally have a crush strength (measured by the method described in the Example) of about 4–20 lb per particle. Generally, their pore volume (measured by water intrusion) is about 0.3–0.5 $m^2/g$.

These shaped particles obtained in the process of this invention can be employed as sorbent materials, e.g., for removing impurities (disclosed in U.S. Pat. Nos. 4,343,693 and 4,344,841) from hydrocarbon liquids (in particular natural gas liquids), or for removing hydrogen fluoride from liquid paraffin streams (in particular hydrocarbon products produced by HF alkylation) or from sulfolane, or for removing pollutants (e.g., benzene) from aqueous streams (such as wastewater or river water).

The following example is provided to further illustrate this invention and is not to be construed as unduly limiting the scope.

EXAMPLE 1000 grams of used FCC cracking catalyst fines from a Phillips Petroleum Company refinery were mixed with a solution of either 200 grams of citric acid or, alternatively, 200 grams of anhydrous sulfuric acid in 2.5 liters of distilled water at a temperature of 200° F. The FCC catalyst fines (about 10 weight-% zeolite in a silica-alumina matrix) had an average particle size of about 45–60 microns, and contained about 62 weight-% Si, about 30 weight-% Al, about 0.9 weight-% Fe, about 0.2 weight-% Ni and about 0.4 weight-% V. The mixture of aqueous acid solution and FCC catalyst fines was heated at about 200° F. for about 5 minutes and was subsequently filtered. The filter cake was dried at about 250° F. (121° C.).

680 grams of the dried, acid-treated FCC catalyst fines and 19 grams calcium aluminate (Secar 71, provided by La Farge Calcium Aluminates, Inc., Chesapeake, Va.) were placed in a lab-scale mix-muller. Also added to the mix-muller was a liquid material which had been prepared by combining and stirring 103 grams of water glass (containing Na silicates at a concentration equivalent to 27–29 weight-% $SiO_2$) with 85 mL of distilled water, followed by adding 30 mL of an aqueous, concentrated phosphoric acid solution (containing 85 weight-% $H_3PO_4$). The entire mixture (i.e., FCC catalyst fines, Ca aluminate and the above-described liquid material) was mixed in the mix-muller for 30 minutes. The mix-muller content was then extruded through an aluminum die plate containing four 1/8 inch holes. The extrudate was dried at about 250° F. (121° C.) for 3 hours and calcined in air at 700° C. for 3 hours.

The crush strength of about 50 calcined extrudate particles from each batch was measured with a crush strength apparatus equipped with two metal plates of 1/8 inch diameter and a 0–30 lb. force gauge. Average crush strength data for representative batches of the calcined extrudates prepared in accordance with the process of this invention are listed in Table I. This table also contains average crush strength data for a control material which was prepared in accordance with the above-described procedure except that no acid pretreatment (prior to mixing with Ca aluminate, sodium silicate, and phosphoric acid solution) was carried out.

TABLE I

| Run | Acid Pretreatment | Crush Strength (lb) |
| --- | --- | --- |
| 1 (Control) | No | 2.6 ± 1.0 |
| 2[1] (Invention) | Yes | 10.7 ± 3.3 |
| 3[1] (Invention) | Yes | 11.6 ± 3.3 |
| 4[1] (Invention) | Yes | 13.6 ± 5.2 |
| 5[2] (Invention) | Yes | 10.9 ± 2.7 |

[1]pretreated with a citric acid solution
[2]pretreated with a $H_2SO_4$ solution Test data in Table I clearly show that the acid pretreatment (with aqueous citric or sulfuric acid) had an unexpected, significant effect on the crush strength of calcined extrudates prepared from FCC catalyst fines, calcium aluminate and a sodium silicate/phosphoric acid binder system.

Calcined extrudates which had been prepared from FCC catalyst fines substantially in accordance with this invention (employing citric acid pretreatment) were used as sorbent materials in a refinery of Phillips Petroleum Company to remove small amounts of surfactants and other impurities from a depropanized natural gas liquid (NGL) stream containing mainly liquid $C_4$–$C_6$ paraffins. During this plant test, the calcined extrudates retained their structural integrity.

Laboratory-scale tests (not described in detail herein) showed that FCC catalyst particles were effective in removing small amounts of HF from alkylation products (containing $C_7$+ paraffins) and from sulfolane. Based on these lab test results, it is concluded that the extrudates prepared in accordance with this invention (comprising acid pretreatment) will also be effective HF sorbents.

Reasonable variations, modifications and adaptations for various conditions can be made within the scope of the disclosure and the appended claims without departing from the scope of this invention.

That which is claimed is:

1. A process for making a shaped composition from catalytic cracking catalyst fines which comprises the steps of:
    (a) contacting zeolite-containing catalytic cracking catalyst particles having an average particle size of about 10 microns to about 100 microns with an aqueous acid solution comprising at least one acid selected from the group consisting of sulfuric acid, nitric acid, hydrochloric acid, and carboxylic acids containing 1–8 carbon atoms per molecule for a time period of at least about 10 minutes,
    (b) substantially separating said aqueous acid solution from the acid-treated catalyst particles obtained in step (a),
    (c) substantially drying the separated, acid-treated catalyst particles obtained in step (b),
    (d) mixing the substantially dried, acid-treated catalyst particles obtained in step (c) with calcium aluminate, at least one sodium silicate, phosphoric acid and water so as to prepare a shapable mixture,
    (e) shaping the mixture obtained in step (d),
    (f) substantially drying the shaped particles obtained in step (e), and
    (g) calcining the substantially dried, shaped particles obtained in step (f) at a temperature of about 500° C. to about 900° C. for a time period of at least about 0.5 hour.

2. A process in accordance with claim 1, wherein said aqueous acid solution used in step (a) comprises sulfuric acid.

3. A process in accordance with claim 2, wherein the sulfuric acid concentration in said aqueous acid solution is about 0.1–1.0 mol/l.

4. A process in accordance with claim 1, wherein said aqueous acid solution used in step (a) comprises citric acid.

5. A process in accordance with claim 4, wherein the citric acid concentration in said aqueous acid solution is about 0.1–1.0 mol/l.

6. A process in accordance with claim 1, wherein said contacting in step (a) is carried out for a time period in the range of about 5 minutes to about 12 hours.

7. A process in accordance with claim 6, wherein the weight ratio of said aqueous acid solution to said catalytic cracking particles in step (a) is about 1:1 to about 5:1, and the concentration of said at least one acid in said aqueous solution is about 0.1 to about 1.0 mol/l.

8. A process in accordance with claim 1, wherein separating step (b) is carried out by filtration.

9. A process in accordance with claim 1, wherein drying step (c) is carried out at a temperature of about 80°–200° C. for a time period of about 10 minutes to about 20 hours.

10. A process in accordance with claim 9, wherein the substantially dried particles obtained in step (c) have a water content of about 1–5 weight percent.

11. A process in accordance with claim 1, wherein the at least one sodium silicate employed in step (d) is contained in water glass, and the chemical formula of phosphoric acid employed in step (d) is $H_3PO_4$.

12. A process in accordance with claim 11, wherein step (d) is carried out by first preparing a liquid binder mixture containing about 30–35 weight-% sodium silicate, about 10–15 weight-% phosphoric acid and about 50–60 weight-% water, and then combining said liquid binder mixture with the calcium aluminate and the substantially dried particles obtained in step (c).

13. A process in accordance with claim 11, wherein the shapable mixture obtained in step (d) has been formed from about 60–70 weight-% substantially dried particles obtained in step (c), about 1–2 weight-% calcium aluminate, about 5–10 weight-% sodium silicate, about 1–5 weight-% phosphoric acid and about 10–20 weight-% water.

14. A process in accordance with claim 1, wherein shaping step (e) is carried out by extrusion.

15. A process in accordance with claim 1, wherein drying step (f) is carried out at a temperature of about 80°–200° C. for a time period of about 0.5–5 hours.

16. A process in accordance with claim 1, wherein calcining step (g) is carried out at a temperature of about 600°–800° C. for a time period of about 5 minutes to about 3 hours.

17. A shaped composition obtained by the process of claim 1.

18. A shaped composition obtained by the process of claim 13.

19. A shaped composition obtained by the process of claim 14.

20. A shaped composition obtained by the process of claim 19 having a crush strength of about 4–20 lb/particle and a pore volume of about 0.3–5 $m^2/g$.

* * * * *